US011828941B2

(12) United States Patent
Genier et al.

(10) Patent No.: US 11,828,941 B2
(45) Date of Patent: Nov. 28, 2023

(54) WAVEGUIDE FOR TRANSMITTING LIGHT

(71) Applicant: CORNING INCORPORATED, Corning, NY (US)

(72) Inventors: Michael Lucien Genier, Horseheads, NY (US); Mark Francis Krol, Painted Post, NY (US); Michael John Moore, Asheville, NC (US); Horst Schreiber, Livonia, NY (US)

(73) Assignee: Corning Incorporated, Corning, NY (US)

( * ) Notice: Subject to any disclaimer, the term of this patent is extended or adjusted under 35 U.S.C. 154(b) by 684 days.

(21) Appl. No.: 16/778,912

(22) Filed: Jan. 31, 2020

(65) Prior Publication Data
US 2020/0257120 A1    Aug. 13, 2020

Related U.S. Application Data

(60) Provisional application No. 62/804,967, filed on Feb. 13, 2019.

(51) Int. Cl.
*G02B 27/01* (2006.01)
*F21V 8/00* (2006.01)
(Continued)

(52) U.S. Cl.
CPC ....... *G02B 27/0172* (2013.01); *G02B 6/0016* (2013.01); *G02B 6/0038* (2013.01);
(Continued)

(58) Field of Classification Search
CPC ...... G02B 27/01; G02B 27/0103; G02B 5/32; G02B 30/40; G02B 30/50; G02B 30/56;
(Continued)

(56) References Cited

U.S. PATENT DOCUMENTS

| | | | |
|---|---|---|---|
| 8,848,289 B2 | 9/2014 | Amirparviz et al. | |
| 9,057,826 B2 | 6/2015 | Gupta et al. | |

(Continued)

FOREIGN PATENT DOCUMENTS

| | | |
|---|---|---|
| CN | 107873086 A | 4/2018 |
| CN | 107966820 A | 4/2018 |

(Continued)

OTHER PUBLICATIONS

International Search Report and Written Opinion of the International Searching Authority; PCT/US2020/014506; dated May 6, 2020; 11 Pages; European Patent Office.

(Continued)

*Primary Examiner* — Joseph P Martinez
*Assistant Examiner* — Grant A Gagnon
(74) *Attorney, Agent, or Firm* — Amy T. Lang

(57) ABSTRACT

An optical device includes a stack that includes a first curved optical element stacked with a second curved optical element. The second curved optical element propagates light by total internal reflection. The stack also includes an incoupling diffractive grating that incouples the light into the second optical element and an outcoupling diffractive grating optically coupled to the incoupling diffractive grating through the second curved optical element. The outcoupling diffractive grating directs the light. The first curved optical element has a first refractive index, the second curved optical element has a second refractive index, and the first refractive index is different from the second refractive index by approximately 0.15 to 1.2.

20 Claims, 14 Drawing Sheets

(51) Int. Cl.
*G02B 27/42* (2006.01)
*G02C 7/02* (2006.01)

(52) U.S. Cl.
CPC ........ *G02B 6/0065* (2013.01); *G02B 27/4205* (2013.01); *G02B 27/4272* (2013.01); *G02C 7/022* (2013.01); *G02B 2027/0178* (2013.01); *G02B 2027/0194* (2013.01)

(58) Field of Classification Search
CPC ........ G02B 27/0101; G02B 2027/0118; G02B 2027/014; G02B 2027/0156; G02B 27/0172; G02B 13/22; G02B 2027/0174; G02B 2027/0178; G02B 27/1093; G02B 6/00; G02B 17/08; G02B 17/0816; G02B 17/086; G02B 2027/012; G02B 2027/0123; G02B 2027/0132; G02B 2027/0138; G02B 2027/0141; G02B 2027/0165; G02B 2027/0181; G02B 26/10; G02B 27/0149; G02B 27/017; G02B 27/1086; G02B 3/0087; G02B 5/02; G02B 5/0252; G02B 5/0257; G02B 5/0284; G02B 5/1819; G02B 5/1866; G02B 5/203; G02B 6/266
USPC .......................................................... 359/13
See application file for complete search history.

(56) References Cited

U.S. PATENT DOCUMENTS

| | | | |
|---|---|---|---|
| 9,372,347 | B1 | 6/2016 | Levola et al. |
| 9,535,253 | B2 | 1/2017 | Levola et al. |
| 9,791,696 | B2 | 10/2017 | Woltman et al. |
| 9,910,276 | B2 | 3/2018 | Vallius et al. |
| 10,146,054 | B2 | 12/2018 | Martinez et al. |
| 10,345,590 | B2 | 7/2019 | Samec et al. |
| 2011/0227813 | A1 | 9/2011 | Haddick et al. |
| 2016/0033784 | A1 | 2/2016 | Levola et al. |
| 2016/0062124 | A1 | 3/2016 | Callier et al. |
| 2017/0010465 | A1 | 1/2017 | Martinez et al. |
| 2017/0131546 | A1 | 5/2017 | Woltman et al. |
| 2017/0153454 | A1 | 6/2017 | Callier et al. |
| 2017/0285347 | A1 | 10/2017 | Cai et al. |
| 2017/0293145 | A1 | 10/2017 | Miller et al. |
| 2017/0336641 | A1 | 11/2017 | Von und zu Liechtenstein |
| 2018/0011324 | A1 | 1/2018 | Popovich et al. |
| 2018/0052277 | A1 | 2/2018 | Schowengerdt et al. |
| 2018/0095279 | A1 | 4/2018 | Bouchier et al. |
| 2018/0136486 | A1 | 5/2018 | Macnamara et al. |
| 2018/0275350 | A1 | 9/2018 | Oh et al. |
| 2018/0284440 | A1 | 10/2018 | Popovich et al. |
| 2018/0321736 | A1 | 11/2018 | Masson |
| 2018/0373044 | A1 | 12/2018 | Alexander et al. |
| 2019/0155027 | A1 | 5/2019 | Marshall |
| 2019/0212564 | A1 | 7/2019 | Rousseau et al. |
| 2020/0070453 | A1 | 3/2020 | Piotrowski et al. |
| 2022/0260838 | A1 | 8/2022 | Popovich et al. |

FOREIGN PATENT DOCUMENTS

| | | |
|---|---|---|
| CN | 108351516 A | 7/2018 |
| CN | 108474945 A | 8/2018 |
| CN | 108803028 A | 11/2018 |
| GB | 2550958 A | 12/2017 |
| TW | 201802536 A | 1/2018 |
| WO | 2016/113534 A1 | 7/2016 |
| WO | 2016/149416 A1 | 9/2016 |
| WO | 2017/060665 A1 | 4/2017 |
| WO | 2017/207987 A1 | 12/2017 |
| WO | 2018/050416 A1 | 3/2018 |
| WO | 2018/087011 A1 | 5/2018 |

OTHER PUBLICATIONS

Ayras et al; "Exit Pupil Expander With a Large Field of View Based on Diffractive Optics"; Journal of the SID 17/8, 2009, pp. 659-664.
Dehoog et al; "Field of View Limitations in See-Through HMDs Using Geometric Waveguides"; Applied Optics, 55(22), pp. 5924-5930 (2016.
Levola et al; "Near-to-Eye Display With Diffractive Exit Pupil Expander Having Chevron Design"; Journal of the SID 16/8, 2008 pp. 857-862.
Levola; "Diffractive Optics for Virtual Reality Displays"; Journal of the SID 14/5, 2006 pp. 467-475.
Levola; "Novel Diffractive Optical Components for Near to Eye Displays ", SID 06 Digest, pp. 64-67.
Chinese Patent Application No. 202080014487.2, Office Action dated Jun. 10, 2023, 5 pages (English Translation only), Chinese Patent Office.
Taiwanese Patent Application No. 109104169, Office Action dated Sep. 1, 2023, 3 pages (English Translation Only); Taiwanese Patent Office.

WAVEGUIDE FOR TRANSMITTING LIGHT

This application claims the benefit of priority to U.S. Provisional Application Ser. No. 62/804,967 filed on Feb. 13, 2019, the content of which is relied upon and incorporated herein by reference in its entirety.

BACKGROUND

Field

The present disclosure relates to waveguides for guiding light, for example, guiding light to a head mounted display.

Technical Background

Head-mounted displays have grown in availability and popularity due to recent advances in light projection technologies. Head-mounted displays are now capable of presenting digital, virtual images to a user. The virtual image, which may represent an object or other information, seemingly exists within the surrounding environment of the user. This is typically accomplished by projecting light from various locations of an optical element (e.g., a lens) directly to the user's eye. Head-mounted displays are also called near-to-eye or near-eye devices. These terms reference optical calculations for image formation that are different from traditional electronic displays (e.g., monitor screen). For a user of a head-mounted display, a visual experience is often called 'virtual reality' if the user is isolated from the surrounding environment, while presented with a virtual image. The term 'augmented reality' often describes a visual experience where a virtual image is presented to the user as an overlay to the real world environment, enhancing visual information received by the user. And, when the visual experience allows for the user to interact with virtual objects that are seemingly integrated into the user's real world environment, the experience is often called 'mixed reality.'

A 'non-immersive' head-mounted display uses a light directing element to project digital information to a user's eye. The light directing element leaves much of the user's field of view vacant of digital information—a non-immersive visual experience. A cell phone virtual reality headset is an example of an 'immersive' head-mounted display. A user mounts their mobile phone to the headset. Then the headset is mounted on the user so the screen of the mobile phone covers most of the user's field of view—an immersive visual experience. In these types of head-mounted displays, additional optical elements (e.g., eyeglass lens) are optional and not required. In another example, an immersive head-mounted display may guide light through one or more layers of see-through material(s) that, when stacked, resemble an eyeglass lens that spans a large portion of a field of view of a user. This type of head-mounted display is capable of producing a mixed reality experience by projecting light into a user's eye. This appears to be from various points of the user's field of view (e.g., from different points on the rear surface of the lens). Yet it simultaneously permits full visibility of the real environment. But these types of head-mounted displays are large and unappealing for use in public settings, as they may attract unwanted attention from onlookers and passersby.

Currently, the barriers to a wide adoption of head-mounted displays are cost, size, electronics challenges, optical challenges, social acceptance challenges, among others. For example, head-mounted displays are known to be much larger and conspicuous than other, more socially acceptable eyewear (e.g., prescription glasses, sunglasses). It is challenging to reduce the size of optical elements that provide light transport to a user's eye.

SUMMARY

There is a need in the art for low cost, discreet optical elements capable of achieving light projection for virtual, augmented, and mixed reality applications.

According to a first embodiment, an optical device comprises a stack of curved optical elements. The stack comprises a first curved optical element stacked with a second curved optical element. The second curved optical element is configured to propagate light by total internal reflection. The stack further comprises an incoupling diffractive grating configured to incouple the light into the second curved optical element and an outcoupling diffractive grating optically coupled to the incoupling diffractive grating through the second curved optical element, the outcoupling diffractive grating configured to direct the light. The first curved optical element has a first refractive index, the second curved optical element has a second refractive index, and the first refractive index is different from the second refractive index by approximately 0.15 to 1.2.

A second embodiment includes the optical device of the first embodiment, wherein the stack further comprises a third curved optical element stacked with the second curved optical element. The third curved optical element is configured to protect the second curved optical element and has a third refractive index that is different from the second refractive index by approximately 0.15 to 1.2.

A third embodiment includes the optical device of the first or second embodiments, wherein the first and/or third refractive indices are higher than the second refractive index.

A fourth embodiment includes the optical device of the first or second embodiments, wherein the first and/or third refractive indices are lower than the second refractive index.

A fifth embodiment includes the optical device of the first, second, or fourth embodiments, wherein the first and/or third refractive indices are between approximately 1.4-1.6 and the second refractive index is greater than approximately 1.7.

A sixth embodiment includes any of the previous embodiments, wherein the outcoupling diffractive grating is further configured to redirect at least a portion of the light into the second curved optical element.

A seventh embodiment includes any of the previous embodiments, wherein the outcoupling diffractive grating is further configured to outcouple at least a portion of the light into the first curved optical element.

An eighth embodiment includes any of the previous embodiments, wherein the outcoupling diffractive grating is positioned along an interface between the first and second curved optical elements, along an interface between the second and third curved optical elements, or inside the second curved optical element.

A ninth embodiment includes any of the previous embodiments, wherein the incoupling diffractive grating is positioned along an interface between the first and second curved optical elements, along an interface between the second and third curved optical elements, or inside the second curved optical element.

A tenth embodiment includes any of the previous embodiments, wherein the outcoupling diffractive grating comprises a reflective grating or a refractive grating.

An eleventh embodiment includes any of the previous embodiments, wherein the incoupling diffractive grating comprises a reflective grating or a refractive grating.

A twelfth embodiment includes the optical device of the tenth or eleventh embodiments, wherein the outcoupling diffractive grating and the incoupling diffractive grating are further configured to direct the light using $-1^{st}$ order transmission, $+1^{st}$ order transmission, $-1^{st}$ order reflection, and/or $1^{st}$ order reflection.

A thirteenth embodiment includes any of the previous embodiments, wherein the light is transmitted through the first curved optical element before interacting with the incoupling grating.

A fourteenth embodiment includes any of the previous embodiments, wherein the light is not transmitted through the first curved optical element before interacting with the incoupling diffractive grating.

A fifteenth embodiment includes any of the previous embodiments, the optical device further comprising an interlayer positioned between the first and second curved optical elements, and/or another interlayer positioned between the second and third curved optical elements.

A sixteenth embodiment includes the optical device of the fifteenth embodiment, wherein the interlayer and/or the another interlayer comprise an air gap or adhesive material.

A seventeenth embodiment includes any of the previous embodiments, wherein the light comprises red, green, and/or blue wavelengths.

An eighteenth embodiment includes any previous embodiments, wherein the first, second, and/or third curved optical elements comprise a rigid body configured to support the optical device and prevent the optical device from bending.

A nineteenth embodiment includes any of the previous embodiments, wherein the optical device further comprises a base curve greater than approximately base 2, base 4, base 6, base 8, or base 10.

A twentieth embodiment includes any of the previous embodiments, wherein a thickness of the second curved optical element does not exceed approximately 1000 microns, 800 microns, or 600 microns.

A twenty-first embodiment includes any of the previous embodiments, wherein a thickness of the optical device does not exceed approximately 15 mm, 12 mm, 11 mm, or 10 mm.

A twenty-second embodiment includes any of the previous embodiments, wherein the second curved optical element comprises silicon nitride, silicon oxy nitride, hafnia, alumina, tantala, tantalum oxy nitrides, titanium dioxide, or zirconia, scandium oxide, niobium oxide, lanthanum titanate, lanthana, ceria, praseodymia, or yttria.

A twenty-third embodiment includes any of the previous embodiments, wherein the first and/or third optical elements comprise polymethylmethacrylate, polymethylpentene, cyclo olefin polymer, cyclic olefin copolymer, styrene acrylate, polycarbonate, CR-39, polystyrene, polyetherimide, polyethersulfone, polyethylene terephthalate, or high purity fused silica.

A twenty-fourth embodiment includes any of the previous embodiments, wherein the third curved optical element comprises an optical shape configured to provide ophthalmic corrective power on a real world image.

A twenty-fifth embodiment includes the optical device of the twenty-fourth embodiment, wherein ophthalmic corrective power is between approximately −10 to 10 diopter.

A twenty-sixth embodiment includes any of the previous embodiments, wherein the outcoupling diffractive grating is further configured to direct the outcoupled portion of the light such that the light converges, diverges, or is substantially collimated.

A twenty-seventh embodiment includes any of the previous embodiments, wherein the first curved optical element comprises an optical shape configured to redirect the outcoupled portion of the light such that the light converges, diverges, or is substantially collimated as the light exites the first curved optical element.

A twenty-eighth embodiment includes any of the previous embodiments, wherein the optical device further comprises a maximum horizontal field of view greater than approximately 40 degree and less than approximately 140 degrees, greater than approximately 60 degrees and less than approximately 140, greater than approximately 80 degrees and less than approximately 140, greater than approximately 100 degrees and less than approximately 140, or greater than approximately 120 degrees and less than approximately 140.

A twenty-ninth embodiment includes any of the previous embodiments, the optical device further comprising at least an intermediate grating configured to expaned the incoupled light so that the outcoupled portion of the light forms a two dimensional array where each member of the array is a replication of the incoupled light.

A thirtieth embodiment includes a system of optical devices, the system comprising a plurality of the optical devices of the first embodiment.

Additional features and advantages of the processes and systems described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings.

Figure 1:
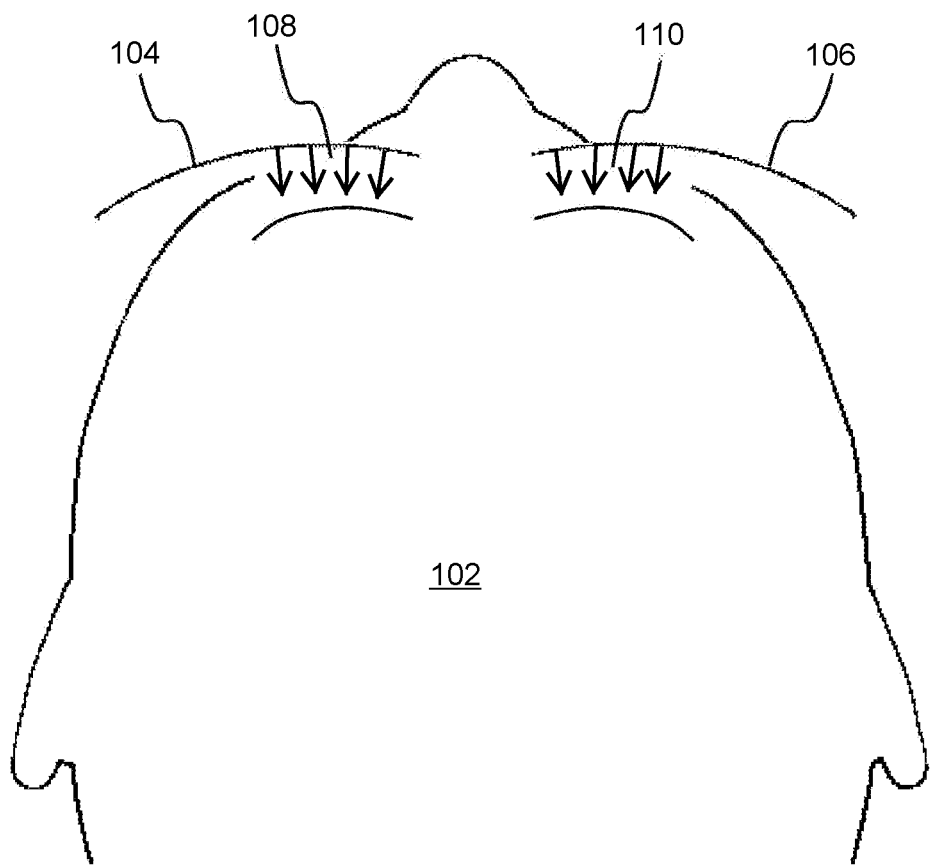
FIG. 1 shows a top view of a user wearing an optical device, according to one or more embodiments.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. Additionally, generally, the left-most digit(s) of a reference number identifies the drawing in which the reference number first appears. Unless otherwise indicated, the drawings provided throughout the disclosure should not be interpreted as to-scale drawings.

DETAILED DESCRIPTION

Reference will now be made in detail to embodiments of optical elements and methods for displaying digital images, particularly in a head-mounted display, examples of which are illustrated in the accompanying drawings.

Embodiments are described herein to facilitate designing and producing optical devices (e.g., wearable lens comprising a lightguide) that are capable of guiding light beams and outputting the light beams as a digital image to a user of a head-mounted display employing the optical device(s).

Estimation terms, such as "approximate," "approximately," "about," and the like may be used herein to indicate the value of a given quantity that may vary based on a particular technology and/or certain parameter(s). For example, the estimation term may modify amounts, sizes, formulations, parameters, and other quantities and characteristics, and need not be exact, but may be approximate and/or larger or smaller, as desired, reflecting tolerances, conversion factors, rounding off, measurement error and the like, and other factors known to those of skill in the art. Such estimation terms may indicate a value of a given quantity that varies within, for example, 0-10% of the value (e.g., ±0.5%, ±5%, or ±10% of the value).

Directional and spatially relative terms, such as "beneath," "below," "lower," "above," "on," "upper," "top," "bottom," "left," "right," and the like, may be used herein for ease of description to describe one element or feature's relationship to another element(s) or feature(s) as illustrated in the figures. The directional and spatially relative terms are intended to encompass different orientations of the device in use or operation in addition to the orientation depicted in the figures. The apparatus may be otherwise oriented (rotated 90 degrees or at other orientations) and the directional and spatially relative descriptors used herein may likewise be interpreted accordingly.

The terms "viewer," "wearer," "typical wearer," "user," "typical user," and the like may be used herein to refer to a median user in general, a median user according to a demographic or activity, or a user having physical dimensions conforming to a standard or a well-known database of human measurements, among others. For example, a typical head-mounted display user may be one having physical dimensions that conform to the American National Standards Institute (ANSI), European Standard, or anthropometric surveys.

The term "light" may be used herein to indicate a form of electromagnetic radiation," or simply "radiation," and these terms may be used interchangeably. Similarly, the term "beam" may be used herein to refer to light having a beam or beam-like arrangement.

The term "lightguide" may be used herein to refer to an optical component that guides light, so-called a "waveguide," and the terms "lightguide" and "waveguide" may be used interchangeably.

The term "index" may be used herein to refer to a refractive index and the term may be used to characterize a material, e.g., a higher index material may refer to a material that has a comparatively higher refractive index than another material.

The term "input," "launch," "incouple," "inject," and the like may be used herein to describe light entering a medium. Similarly, the terms "output," "exit," "outcouple," "eject," and the like may be used herein to describe light exiting a medium.

Despite the many advances of head-mounted displays, there is a continuing need for optical structures having excellent optical qualities while allowing a wider field of view, form factors approaching non-electronic eyewear, and reduced cost of construction.

A lightguide is an optical structure that guides light that is confined to a region of space as the light propagates. Confinement of light is typically achieved by using a refractive index difference between the lightguide and its surrounding material and an angle at which the light is launched into the lightguide. With the right conditions, the light experiences total internal reflection. An example of a common lightguide is an optical fiber, which confines light propagation along a narrow 'pipe'—the so-called core of the optical fiber. Typically, propagation is relatively lossless, meaning that only a small, often negligible, fraction of the light is leaked through the lightguide or is otherwise attenuated. While the travel path of light through an optical fiber is relatively linear (e.g., traveling only along the optical axis of the optical fiber), a two dimensional lightguide can be engineered as a thin planar layer of material having a refractive index difference with its surrounding material. Material surrounding the lightguide maybe a cladding or air. Additionally, such a planar lightguide may not be restricted to a flat plane. For example, the lightguide may be curved so as to follow a two dimensional curvature. Merely for ease of discussion and not limitation, the term lightguide will refer to the two dimensional variety, unless otherwise noted.

A curved lightguide has various advantageous over a flat lightguide. For example, a lightguide may be used as a wearable lens in a head-mounted display. In this example, the curvature of the lightguide allows a form factor that wraps around a user's face, allowing for a wider field of view, and a form factor that resembles common eyewear (e.g., eyeglasses).

FIG. 1 shows a top view of a user 102 wearing an optical device 104 and an optical device 106, according to one or more embodiments. In some embodiments, optical device 104 and optical device 106 are curved. Optical device 104 and optical device 106 are supported, for example, by eyewear frames (not shown). Optical device 104 and optical device 106, as worn, are in the path of a straight ahead line of sight of user 102. In some embodiments, optical device 104 and optical device 106 wrap around the face of user 102. In some embodiments, optical device 104 is configured to send light 108 to an eye of user 102. Similarly, optical device 106 is configured to send light 110 to another eye of user 102. In some embodiments, optical device 104 and optical device 106 may be combined as a unitary optical device, forming the analog of a unitary lens used for eyewear (e.g., goggle, visor, etc.).

Figure 2:
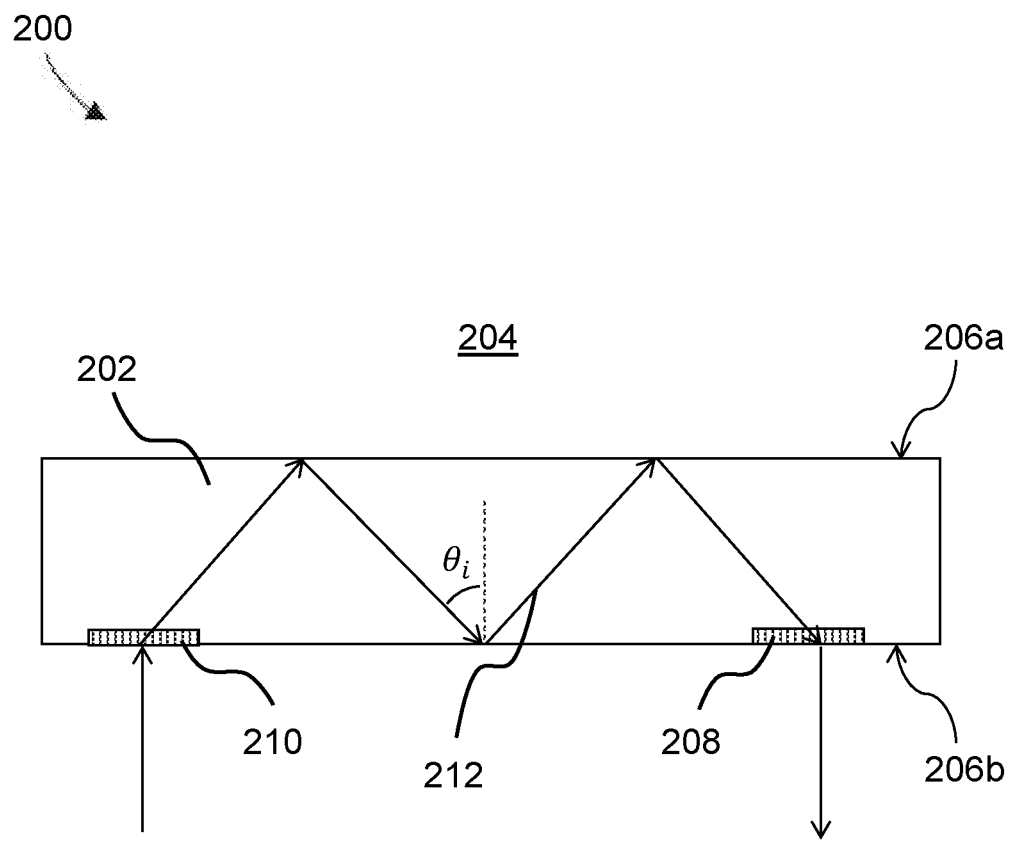
FIG. 2-4 show optical devices, according to one or more embodiments.

Before describing curved lightguides in more detail, it is instructive to first consider flat lightguides. FIG. 2 shows an optical device 200, according to one or more embodiments. In some embodiments, optical device 200 comprises a lightguide 202, a material 204, an interface 206a, an interface 206b, a grating 208, and a grating 210. Grating 208 and grating 210 may also be respectively called outcoupling diffractive grating and incoupling diffractive grating. This naming scheme, e.g., according to the functions of the gratings, may be used herein for gratings in other embodiments of the present disclosure.

In some embodiments, material 204 surrounds lightguide 202. In some embodiments, grating 208 and/or grating 210 may be positioned at interface 206b. In some embodiments, grating 208 and/or grating 210 may be positioned at interface 206a (position not depicted). In some embodiments, grating 208 and/or grating 210 may be positioned inside lightguide 202, e.g., not in contact with material 204 (position not depicted). The different positions of grating 208 and grating 210 allow the use of reflective or refractive behaviors of the gratings, which will be explained later in reference to FIGS. 5 and 6. Interface 206a and interface 206b are approximately parallel.

In some embodiments, lightguide 202 guides light 212 by total internal reflection (TIR) between interface 206a and interface 206b. Lightguide 202 has a refractive index $n_d$ and material 204 has a refractive index $n_0$. In some embodiments, $n_d$ is different from $n_0$. In some embodiments, $n_d$ is greater than $n_0$ in order to allow TIR. Then, TIR occurs when light is incident on either interface 206a or interface 206b with an incidence angle $\theta_i$ such that:

$$\theta_i \geq \theta_c = \arcsin\left(\frac{n_o}{n_d}\right), \quad \text{Eqn. 1}$$

where $\theta_c$ is a so-called critical angle. In other embodiments, $n_d$ is less than $n_0$.

In the arrangement where interface 206a and interface 206b are approximately parallel, light 212 undergoing TIR within lightguide 202 would ordinarily be unable to exit lightguide 202 through either interface 206a or interface 206b. Therefore, in some embodiments, grating 208 is used to outcouple light 212 from lightguide 202. Similarly, in the arrangement where interface 206a and interface 206b are approximately parallel, light 212 would ordinarily be unable to enter lightguide 202 at an angle that would produce the condition $\theta_i \geq \theta_c$. Therefore, in some embodiments, grating 210 is used to incouple light 212 at an angle into lightguide 202. These arrangements of grating 208 and grating 210 modify a direction of light 212 to create or destroy the condition $\theta_i \geq \theta_c$.

TIR performance is sensitive to damage and wear and tear of surfaces of a lightguide. TIR performance is also sensitive to larger scale structural changes to a lightguide, for example, bending a lightguide, which may occur if the lightguide is thin or is made of flexible material. It would be advantageous to optical devices if they included an overmold, encapsulation, or cladding that would allow a more rigid structure and protect lightguides from impacts.

Figure 3:
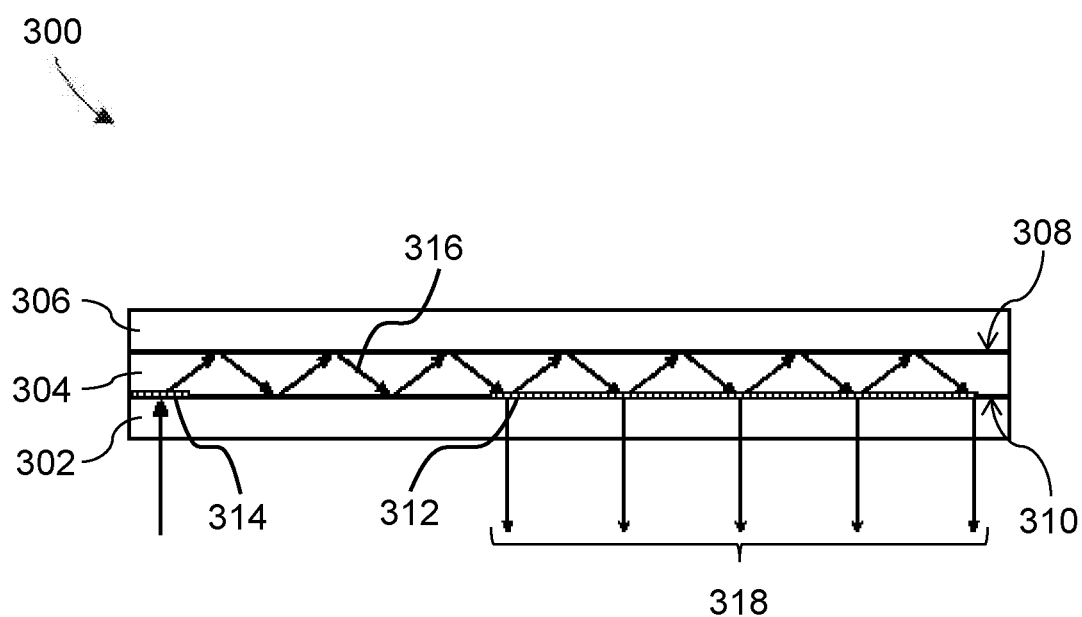

FIG. 3 shows an optical device 300, according to one or more embodiments. In some embodiments, optical device 300 comprises a support layer 302, a lightguide 304, an interface 308, an interface 310, a grating 312, and a grating 314. In some embodiments, optical device 300 comprises a protection layer 306.

In some embodiments, support layer 302, lightguide 304, and protection layer 306 are flat. Support layer 302 is stacked with lightguide 304 at interface 310. Protection layer 306 is stacked with lightguide 304 at interface 308. In some embodiments, protection layer 306 may be absent, for example, in order to reduce a thickness and/or overall size of optical device 300. In some embodiments, grating 312 and/or grating 314 are positioned at interface 310. In some embodiments, grating 312 and/or grating 314 are positioned at interface 308 (position not depicted). In some embodiments, grating 312 and/or grating 314 are positioned inside lightguide 304, e.g., not in contact with support layer 302 or protection layer 306 (position not depicted).

In some embodiments, lightguide 304 guides light 316 using TIR between interface 308 and interface 310. Lightguide 304 has a refractive index $n_d$ and support layer 302 has a refractive index $n_{0,1}$. Protection layer 306 has a refractive index $n_{0,2}$. In some embodiments, $n_d$ is different from $n_{0,1}$ and $n_{0,2}$. In some embodiments, $n_d$ is greater than $n_{0,1}$ and/or greater than $n_{0,2}$ in order to allow TIR. In some embodiments, $n_d$ is less than $n_{0,1}$ and/or less than $n_{0,2}$.

In some embodiments, grating 312 directs light 316. In some embodiments, grating 312 redirects at least a portion of light 316 into lightguide 304. In some embodiments, grating 312 outcouples at least a portion of light 316 into support layer 302. The outcoupled portion of light 316 exits support layer 302, the exiting light represented by beams 318. Beams 318 are delivered, for example, to an eye of a user of optical device 300, similar to optical device 104 and optical device 106 (FIG. 1). In some embodiments, grating 314 is used to incouple light 316 into lightguide 304. The reasons for incoupling light 316 using grating 314 are similar to those discussed above for grating 210 (FIG. 2). It will be apparent to those skilled in the art that the number of output beams shown is not limiting and that one may design optical device 300 to output any number output beams (e.g., a beam per image pixel).

Some advantages of a curved optical device as compared to a flat optical device include a wider field of view and a form factor that more closely resembles common eyewear (e.g., glasses). However, designing a curved optical device involves more than imposing a curve on an existing flat optical device. For example, if a curve were imposed on optical device 300, the geometry guiding light 316 would be altered, the meticulously engineered gratings may no longer function as intended, and directions of beams 318 would be modified, which in turn degrades a quality of an image formed by beams 318. Therefore, embodiments of the present invention provide curved optical devices that compensate for the effects of curvature.

Figure 4:
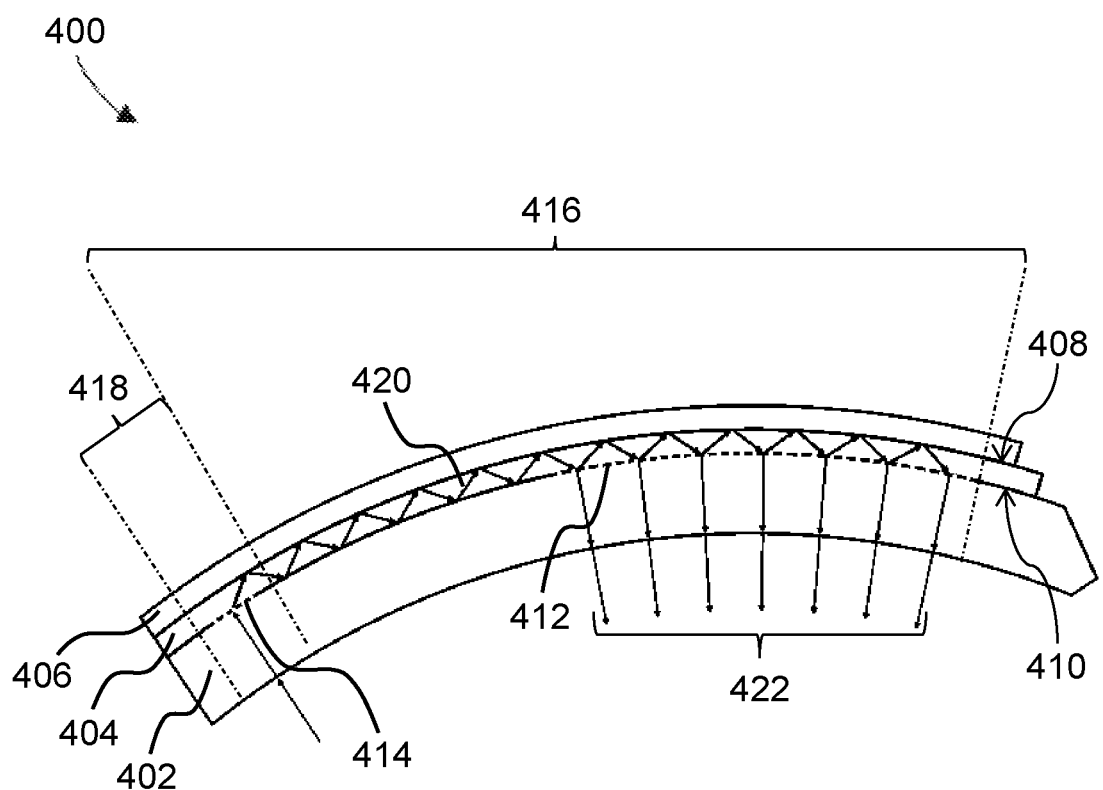

FIG. 4 shows an optical device 400, according to one or more embodiments. In some embodiments, optical device 400 comprises a support layer 402, a lightguide 404, an interface 408, an interface 410, a grating 412, and a grating 414. In some embodiments, optical device 400 comprises a protection layer 406.

In some embodiments, support layer 402, lightguide 404, and protection layer 406 are curved. Support layer 402 is stacked with lightguide 404 at interface 410. Protection layer 406 is stacked with lightguide 404 at interface 408. In some embodiments, interface 408 has a thin, intervening layer of material—an interlayer (e.g., adhesive, air gap). Interface 410 may also include an interlayer. In some embodiments, protection layer 406 may be absent, for example, in order to reduce a thickness and/or overall size of optical device 400. In some embodiments, grating 412 and/or grating 414 are positioned at interface 410. In some embodiments, grating 412 and/or grating 414 are positioned at interface 408 (position not depicted). In some embodiments, grating 412 and/or grating 414 are positioned inside lightguide 404, e.g., not in contact with support layer 402 or protection layer 406 (position not depicted).

In some embodiments, lightguide 404 guides light 420 using TIR between interface 408 and interface 410. Lightguide 404 has a refractive index $n_d$ and support layer 402 has a refractive index $n_{o,1}$. Protection layer 406 has a refractive index $n_{o,2}$. In some embodiments, $n_d$ is different from $n_{o,1}$ and $n_{o,2}$. In some embodiments, $n_d$ is greater than $n_{o,1}$ and/or greater than $n_{o,2}$ in order to allow TIR. In some embodiments, $n_d$ is less than $n_{o,1}$ and/or less than $n_{o,2}$. A difference between refractive indices $n_d$ and $n_{o,2}$ (or $n_{o,1}$) is approximately 0.15-1.2. It will be apparent to those skilled in the art that other value ranges for a refractive index difference are possible. The importance of the refractive index difference will be explained later in reference to FIG. 18.

In some embodiments, optical device 400 may be arranged into a section 416 and a section 418 so that support layer 402, lightguide 404, and protection layer 406 reside in both section 416 and section 418. Section 416 and section 418 may also be respectively called output section and input section of an optical device. This naming scheme, e.g., according to the functions of the section, may be used herein for sections of optical devices in other embodiments of the present disclosure. In some embodiments, grating 412 is located in section 416. In some embodiments, grating 414 is located in section 418. Grating 412 redirects at least a portion of light 420 into lightguide 404. In some embodiments, grating 412 outcouples at least a portion of light 420 into support layer 402. The outcoupled portion of light 420 exits support layer 402, the exiting light represented by beams 422 at section 416. Grating 412 directs light 420 and beams 422. Beams 422 are delivered, for example, to an eye of a user of optical device 400, similar to optical device 104 and optical device 106 (FIG. 1). The number of depicted output beams is not limiting. In some embodiments, grating 414 is used to incouple light 420 into lightguide 404 at section 418. The reasons for incoupling light 420 using grating 414 are similar to those discussed above for grating 210 (FIG. 2).

As light 420 travels through lightguide 404, incidence angles of light 420 on interface 408 and interface 410 may differ after each reflection due to a curvature of lightguide 404. Since the incidence angle influences the interaction of light 420 with grating 412, directions of beams 422 are also influenced by the curvature of lightguide 404. This effect can be compensated for by designing grating 412 with appropriate grating parameters (e.g., linewidth, pitch, etc.). It is more instructive to begin with a description of an incoupling diffractive grating, e.g., grating 414.

Figure 5:
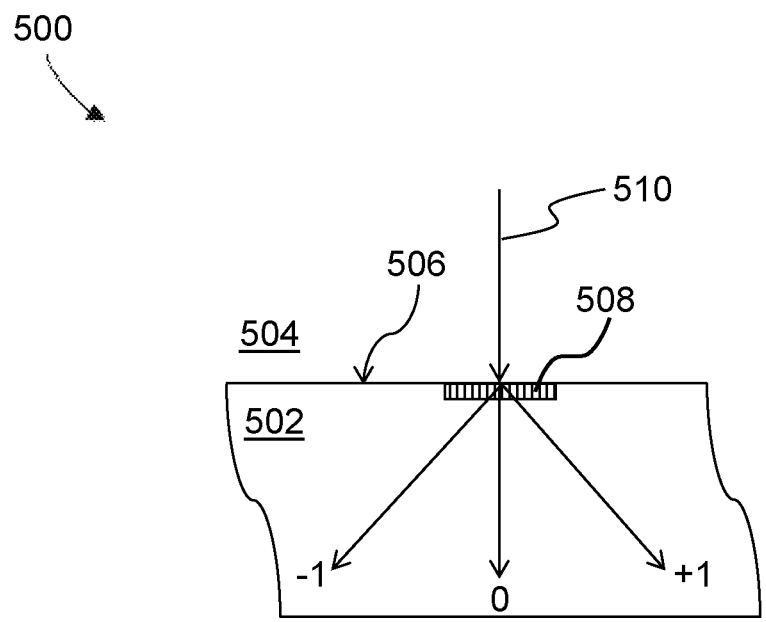
FIG. 5 shows an optical an input section of a flat or curved optical device, according to one or more embodiments.

FIG. 5 shows an input section 500 of a flat or curved optical device, according to one or more embodiments. In some embodiments, input section 500 comprises a lightguide 502, a material 504, an interface 506, and a grating 508.

In some embodiments, material 504 is in contact with lightguide 502 at interface 506. For example, material 504 may be support layer 302 (FIG. 3) or 402 (FIG. 4), protection layer 306 (FIG. 3) or 406 (FIG. 4), or air. Grating 508 is positioned at interface 506.

In some embodiments, light 510, which is incident on interface 506 from the side of material 504, interacts with grating 508. Light 510 is incoupled into lightguide 502. After interacting with grating 508, light 510 may diffract in a number of diffraction angles, often labeled by diffraction orders (e.g., −1, 0, +1, etc.). The light paths shown in FIG. 5 are merely for ease of discussion and not limiting. It will be apparent to those skilled in the art that light 510 has an infinite number of possible incidence angles, including normal incidence, and associated diffraction angles. Diffraction angles are also determined by grating parameters. In some embodiments, light 510 incoupled into lightguide 502 along the $-1^{st}$ or $+1^{st}$ order path is used for transmission using TIR. Additionally, grating 508 need not be used in transmission operation to input light 510 into lightguide 502. Instead, in some embodiments, grating 508 is operated as a reflective diffractive element that is positioned opposite to interface 506. A person skilled in the art will appreciate that, even if grating 508 is positioned inside lightguide 502 (e.g., not in contact with material 504), grating 508 may still be used to incouple light 510 and initiate TIR, whether by reflective or refractive incoupling. In this scenario, light 510 is transmitted through interface 506 (e.g., at approximately normal incidence), travels a distance into lightguide 502, and then encounters grating 508.

Figure 6:
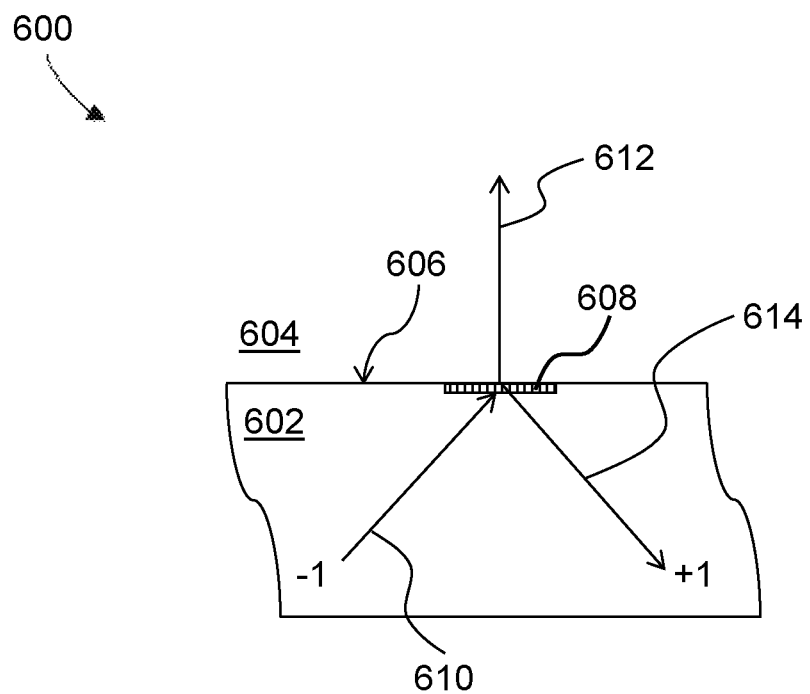
FIG. 6 shows an output section of a flat or curved optical device, according to one or more embodiments.

A similar interaction is applicable to light exiting a lightguide through an outcoupling diffractive grating, e.g., grating 412. FIG. 6 shows an output section 600 of a flat or curved optical device, according to one or more embodiments. In some embodiments, output section 600 comprises a lightguide 602, a material 604, an interface 606, a grating 608.

In some embodiments, material 604 is in contact with lightguide 602 at interface 606. For example, material 604 may be support layer 302 (FIG. 3) or 402 (FIG. 4), protection layer 306 (FIG. 3) or 406 (FIG. 4), or air. In some embodiments, grating 608 is positioned at interface 606.

In some embodiments, light 610, which is incident on interface 606 from the side of lightguide 602, interacts with grating 608. Grating 608 directs light 610. In some embodiments, grating 608 outcouples a portion of light 610 into material 604. The outcoupled portion is light 612. Also, another portion of light 610 is redirected (e.g., reflected) into lightguide 602. The reflected portion is light 614. Merely for ease of discussion and not limitation, FIG. 6 shows a particular configuration for light 610, light 612, and light 614 so as to correspond with the diffraction angles shown in FIG. 5. It will be apparent to those skilled in the art that other diffraction orders may be used. Also, directions of light 612 and light 614 may be modified by altering a direction of light 610 and/or parameters of grating 608. Additionally, grating 608 need not be used in transmission operation, represented by light 612, to output light from lightguide 602. Therefore, in some embodiments, grating 608 is used as a reflective diffractive element for outcoupling light from lightguide 602. For example, if light 614 is given a different direction other than the one depicted (e.g., approximately normal to interface 606), light 614 may then be used as the outcoupled light. In this scenario, light 614 would exit opposite interface 606. A person skilled in the art will appreciate that, even if grating 608 is positioned inside lightguide 602 (e.g., not in contact with material 604), grating 608 may still be used to outcouple light 610, whether by reflective or refractive outcoupling. In this scenario, light 610 first interacts with grating 608 so that light 612 (or light 614) is generated inside lightguide, travels a distance to interface 606 (or the opposite interface) at approximately normal incidence, and then exits lightguide 602.

Figure 7:
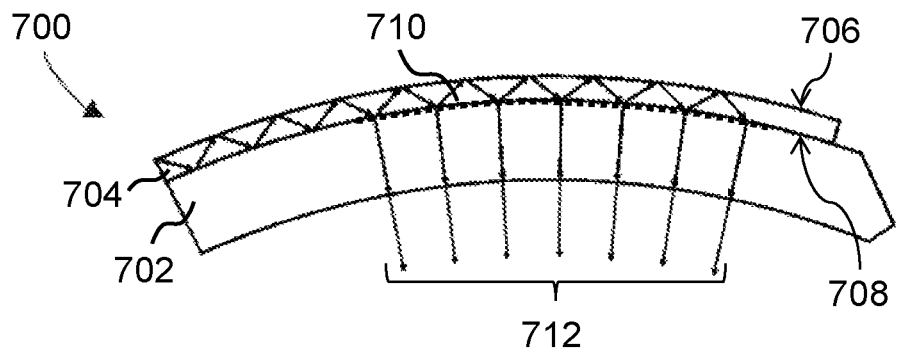
FIG. 7-10 show output sections of curved optical devices, according to one or more embodiments.
Figure 8:
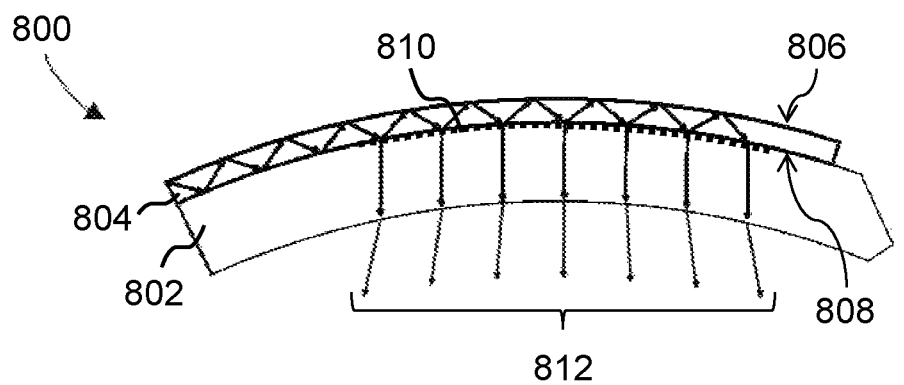
Figure 9:
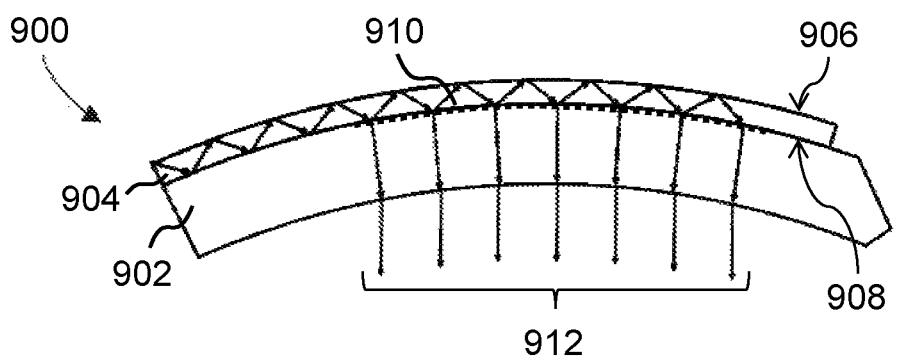

FIGS. 7-9 show output section 700, output section 800, and output section 900, respectively, that can control directions of light output by lightguides, according to one or more embodiments.

Unless otherwise indicated, the following structural description of FIG. 7 also applies analogously to FIGS. 8 and 9 that use similarly numbered elements. In some embodiments, output section 700 comprises a support layer 702, a lightguide 704, an interface 706, an interface 708, and a grating 710. Support layer 702 is stacked with lightguide 704 at interface 708. Grating 710 is positioned at interface 706 or interface 708 according to refraction or reflection operation (reflection position not depicted). In other embodiments, grating 710 is positioned inside lightguide 704, e.g., not in contact with support layer 702 (position not depicted). In some embodiments, light is outcoupled from lightguide 704 by grating 710 to form output beams 712. In some embodiments, output beams 712 are outcoupled from lightguide 704 and into support layer 702, and then exits support layer 702.

It was explained earlier, in reference to output section 600 (FIG. 6), that outcoupling diffractive gratings can be used to direct outcoupled light. Output section 700, output section 800, and output section 900 respectively show distinct configurations of output beams 712, output beams 812, and output beams 912, respectively. In some embodiments, output beams 712 converges. The directions of output beams 712 are achieved by designing appropriate grating parameters that take into account the incidence angles of light traveling through lightguide 704, as well as the refraction of output beams 712 as they exit the outer surface of support layer 702. In some embodiments, output beams 812 are substantially collimated or normal to a viewer's pupil. Output beams 812 can be made substantially collimated by using similar methods as explained for output beams 712. In some embodiments, output beams 912 diverge. Output beams 912 can be made to diverge by using similar methods as explained for output beams 712. By controlling directions of output light as shown in FIGS. 7-9, the apparent distance of an image object formed by output beams 712, output beams 812, or output beams 912 may be manipulated, e.g., an image formed by collimated output beams 912 is at infinity to a user's pupil.

Figure 10:
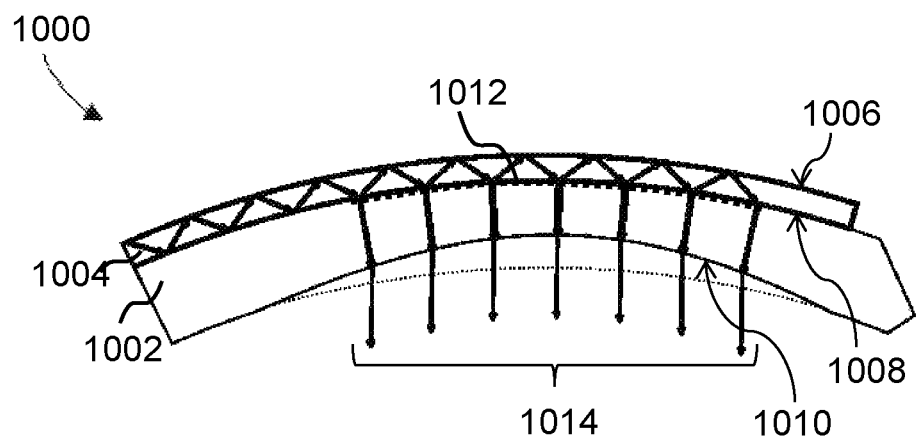

Furthermore, the interaction of light with an output surface of a support layer (e.g., support layer 702 of FIG. 7) may be further controlled by changing a shape of the output surface. FIG. 10 shows an output section 1000 of a curved optical device. In some embodiments, output section 1000 comprises a support layer 1002, a lightguide 1004, an interface 1006, an interface 1008, an interface 1010, and a grating 1012. Interface 1010 has a shape that refracts light. Support layer 1002 is stacked with lightguide 1004 at interface 1008. Interface 1010 is a surface of output section 1000 that faces a user. Grating 1012 is positioned at interface 1006 or interface 1008 according to refraction or reflection operation (reflection position not depicted). In other embodiments, grating 1012 is positioned inside lightguide 1004, e.g., not in contact with support layer 1002 (position not depicted). In some embodiments, light is outcoupled from lightguide 1004 by grating 1012 to form output beams 1014. In some embodiments, output beams 1014 are outcoupled from lightguide 1004 and exits output section 1000 through interface 1010. The shape of interface 1010 is designed to work in conjunction with grating 1012 to generate output beams 1014 in a desired configuration. In the arrangement shown in FIG. 10, output beams 1014 are made substantially collimated or normal to a viewer's pupil. However, it will be apparent to those skilled in the art that other configurations are possible (e.g., divergent or convergent).

Figure 11:
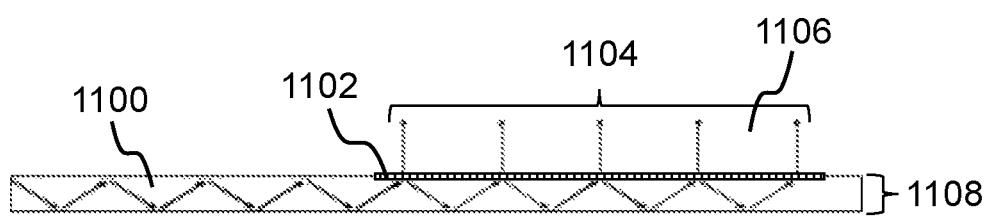
FIG. 11-13 show flat lightguides, according to one or more embodiments.
Figure 12:
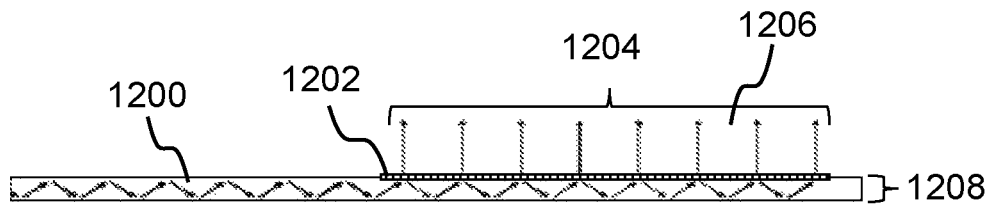
Figure 13:
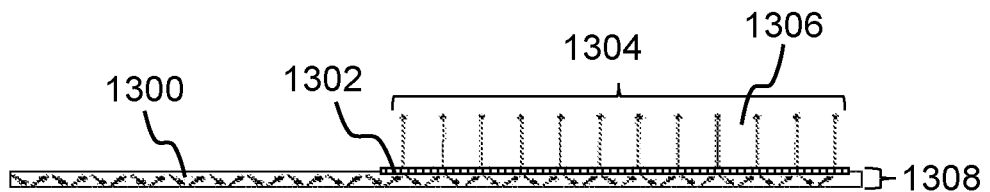

A thickness of a lightguide can be used to control the light. By making lightguides thinner, a denser pupil sampling (e.g., pixel resolution) is possible and head-mounted displays that make use of the lightguide may be made smaller and less conspicuous. FIGS. 11-13 show the effects of scaling a thickness of a lightguide.

Unless otherwise indicated, the following structural description of FIG. 11 also applies analogously to FIGS. 12 and 13 that use similarly numbered elements. FIGS. 11-13 respectively show a flat lightguide 1100, a flat lightguide 1200, and a flat lightguide 1300, according to one or more embodiments. In some embodiments, flat lightguide 1100 comprises a grating 1102. Grating 1102 is configured to outcouple output beams 1104 from flat lightguide 1100. In some embodiments, the space 1106 between the beams of output beams 1104 is determined by a thickness 1108 of the lightguide. The same dependence applies to output beams 1204 and thickness 1208, and output beams 1304 and thickness 1308. The drawings in FIGS. 11-13 merely compare effects of thickness scaling and are not meant to limit structural elements within a given figure (e.g., angles of incidence during total internal reflection, the presence or absence of outer materials, etc.).

FIGS. 11-13 shows that space 1106, space 1206, and space 1306 are proportional to thickness 1108, thickness 1208, and thickness 1308, respectively. In other words, a pupil sampling, or resolution, can be made denser as a thickness of a flat lightguide is reduced.

Figure 14:
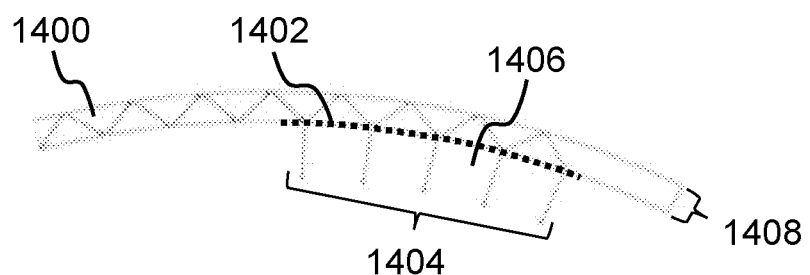
FIG. 14-16 show curved lightguides, according to one or more embodiments.
Figure 15:
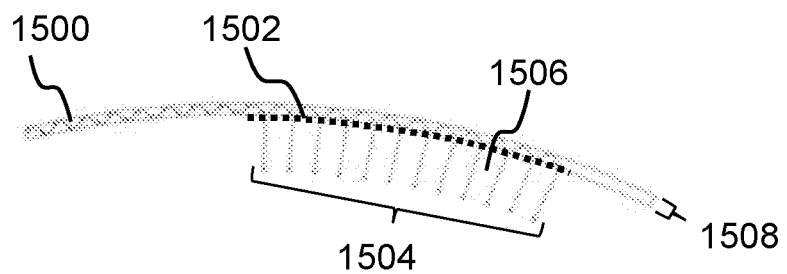
Figure 16:
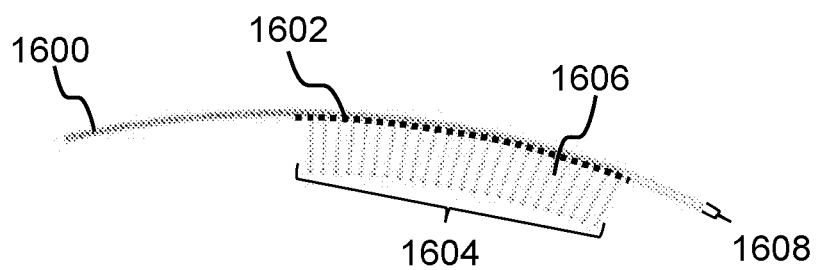

The effects of thickness selection remains true for curved lightguides. FIGS. 14-16 show the effects of scaling a thickness of a lightguide. Unless otherwise indicated, the following structural description of FIG. 14 also applies analogously to FIGS. 15 and 16 that use similarly numbered elements. FIGS. 14-16 respectively show a curved lightguide 1400, a curved lightguide 1500, and a curved lightguide 1600, according to one or more embodiments. In some embodiments lightguide 1400 comprises a grating 1402. Grating 1402 is configured to outcouple output beams 1404 from lightguide 1400. In some embodiments, the space 1406 of between the beams of output beams 1404 is determined by a thickness 1408 of the lightguide. The same dependence applies to output beams 1504 and thickness 1508, and output beams 1604 and thickness 1608. FIGS. 14-16 merely compare effects of thickness scaling and are not meant to limit structural elements within a given figure.

FIGS. 14-16 show that space 1406, space 1506, and space 1606 are proportional to thickness 1408, thickness 1508, and thickness 1608, respectively. In other words, a pupil sampling, or resolution, can be made denser as a thickness of a curved lightguide is reduced.

Therefore, in some embodiments, a thickness of a lightguide, does not exceed 1.0 mm. In some embodiments, a thickness of a lightguide does not exceed 0.8 mm. In some embodiments, a thickness of a lightguide does not exceed 0.6 mm. In some embodiments, a thickness of a lightguide does not exceed 0.4 mm. In some embodiments, a thickness of a lightguide does not exceed 0.3 mm. In some embodiments, a thickness of a lightguide does not exceed 0.2 mm. In some embodiments, a thickness of a lightguide does not exceed 0.1 mm. In some embodiments, a thickness of a lightguide does not exceed 0.05 mm.

Figure 17:
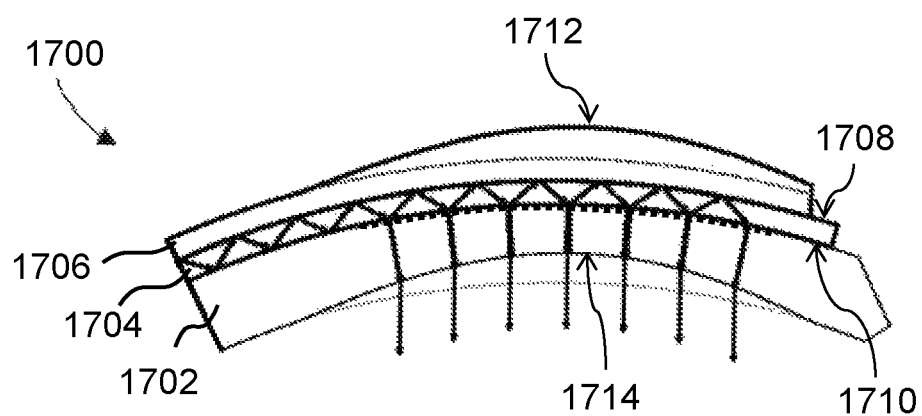
FIG. 17-18 show output sections of curved optical devices, according to one or more embodiments.

Embodiments of the present invention can include with ophthalmic corrections (e.g., prescription lenses). FIG. 17 shows an output section 1700 of a curved optical device, according to one or more embodiments. In some embodiments, output section 1700 comprises a support layer 1702, lightguide 1704, a protection layer 1706, an interface 1708, an interface 1710, an interface 1712, and an interface 1714.

In some embodiments, support layer 1702 is stacked with lightguide 1704 at interface 1710. Protection layer 1706 is stacked with lightguide 1704 at interface 1708. Interface 1714 is a surface of output section 1700 that faces the user. Interface 1712 is a surface of output section 1700 that faces the real world (e.g., away from the user). In some embodiments, interface 1712 has a shape that provides ophthalmic corrective power between approximately −10 to 10 diopter. In some embodiments, the shape of interface 1712 works in conjunction with the furthest opposing surface (e.g., interface 1714) to provide ophthalmic corrective power.

Figure 18:
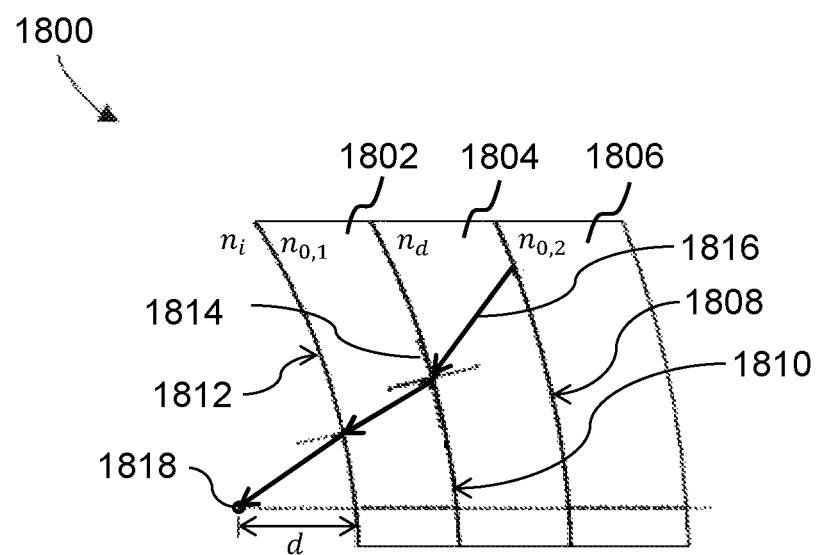

One parameter of a lightguide is the angular range, or maximum field of view, at which the lightguide can deliver light to an eye of a viewer. FIG. 18 will be used to better understand a mathematical relation of the maximum field of view of a lightguide. FIG. 18 shows an output section 1800 of a curved optical device, according to one or more embodiments. In some embodiments, output section 1800 comprises a support layer 1802, a lightguide 1804, a protection layer 1806, an interface 1808, an interface 1810, an interface 1812, and a grating 1814.

In some embodiments, protection layer 1806 is stacked with lightguide 1804 at interface 1808. Support layer 1802 is stacked with lightguide 1804 at interface 1810. Interface 1812 is a surface of output section 1800 that faces a user. Grating 1814 is positioned at interface 1810. Support layer 1802 has a refractive index $n_{0,1}$. Lightguide 1804 has a refractive index $n_d$. Protection layer 1806 has a refractive index $n_{0,2}$. In some embodiments, $n_d$ is greater than $n_{0,1}$ and $n_{0,2}$. The material outside output section 1800 is air and has a refractive index $n_t \approx 1$.

In some embodiments, light 1816 interacts with grating 1814 and is transmitted into support layer 1802. Then, light 1816 exits output section 1800 through interface 1812. Subsequently, light 1816 is directed at a point 1818 (e.g., target). A distance between point 1818 and interface 1812 is defined as d.

The maximum field of view of a curved lightguide can be derived by following an exact forward and backward (QU) ray trace method as described in DeHoog, E., Homstedt, J., & Aye, T. (2016) Field of View of limitations in see-through HMD using geometric waveguides, Applied Optics, 55(22), 5924-5930, which is incorporated by reference herein in its entirety. It can be shown that a maximum field of view $\theta_{FOV}$ of a curved lightguide is:

$$\theta_{FOV} = \arcsin\left(\frac{n_d - G\lambda}{1 + \frac{d}{R}}\right) - \arcsin\left(\frac{n_{0,2} - G\lambda}{1 + \frac{d}{R}}\right), \quad \text{Eqn. 2}$$

where G is a grating frequency, $\lambda$ is the wavelength of light 1816, and R is a radius of curvature of lightguide 1804. Eqn. 2 assumes that an overall thickness of the lightguide is much smaller than R. Eqn. 2 may describe a flat lightguide when R goes to infinity.

It may be advantageous for certain applications to have curved optical devices that wrap around a viewer's face closely, while other applications may be satisfied with a lens shape that is slightly curved (e.g., spectacle-shaped). In embodiments of the present disclosure, the radius of curvature of a lightguide may be chosen to suit an application. However, one must be mindful that Eqn. 2 includes the radius of curvature of a lightguide. That is, the curve radius affects the field of view of an image displayed by an optical device.

In some embodiments, an optical device has a maximum field of view between approximately 20 to 140 degrees. In some embodiments, an optical device has a maximum field of view between approximately 40 to 140 degrees. In some embodiments, an optical device has a maximum field of view between approximately 60 to 140 degrees. In some embodiments, an optical device has a maximum field of view between approximately 80 to 140 degrees. In some embodiments, an optical device has a maximum field of view between approximately 100 to 140 degrees. In some embodiments, an optical device has a maximum field of view between approximately 120 to 140 degrees. In some embodiments, an optical device has a maximum field of view between approximately 20 to 120 degrees. In some embodiments, an optical device has a maximum field of view between approximately 20 to 100 degrees. In some embodiments, an optical device has a maximum field of view between approximately 20 to 80 degrees. In some embodiments, an optical device has a maximum field of view between approximately 20 to 60 degrees. In some embodiments, an optical device has a maximum field of view between approximately 20 to 40 degrees. These value ranges for the maximum field of view may apply to a horizontal field of view, a vertical field of view, or both. It will be apparent to those skilled in the art that other field of view ranges are possible.

A base curve is a useful standard used in the eyewear industry. Specifically, a 530 mm radius standard is used when referring to a "wrap-around" curve of eyewear. In this standard, 530 mm radius of curvature is defined as "base 1." To convert between a base curve value and a radius, the following formula is used:

$$\text{base curve value} = \frac{530 \text{ mm}}{\text{curve radius (in mm)}}. \quad \text{Eqn. 3}$$

For example, some common wrap-around sunglass have a base curve value of about 8 (or base 8). According to Eqn. 3, this would be equivalent to a curve radius of 66.25 mm. And base 0 corresponds to an infinite radius (i.e., flat).

In some embodiments, an optical device has a base curve greater than approximately base 2. In some embodiments, an optical device has a base curve greater than approximately base 4. In some embodiments, an optical device has a base curve greater than approximately base 6. In some embodiments, an optical device has a base curve greater than approximately base 8. In some embodiments, an optical device has a base curve greater than approximately base 10. Some applications may require the base curve to be non-constant but still remain within a range of base curve values, e.g., lenses having a freeform shape. In some embodiments, an optical device has a base curve between approximately base 0 and base 5.6. In some embodiments, an optical device has a base curve between approximately base 2 and base 5. In some embodiments, an optical device has a base curve between approximately base 3 and base 5. In some embodiments, an optical device has a base curve between approximately base 6 and base 10. In some embodiments, an optical device has a base curve between approximately base 7 and base 10. In some embodiments, an optical device has a base curve between approximately base 7 and base 9. Some applications may require that a horizontal base curve be different from a vertical base curve, e.g., lenses having an approximately toric shape. Therefore, these value ranges of the base curve may apply to a horizontal base curve, a vertical base curve, or both. It will be apparent to those skilled in the art that other base curve ranges are possible.

It can be inferred from Eqn. 2 that a larger difference between refractive indices $n_d$ and $n_{0,2}$ results in a larger maximum field of view $\theta_{FOV}$. Some common transparent materials used in eyewear have refractive indices between approximately 1.4-1.6. Materials in this value range may be considered lower index materials in the context of transparent materials used for eyewear lenses. Lower index materials may include polymethylmethacrylate, polymethylpentene, cyclo olefin polymer, cyclic olefin copolymer, styrene acrylate, polycarbonate, CR-39, polystyrene, polyetherimide, polyethersulfone, polyethylene terephthalate and high purity fused silica. These are the materials that may be used for fabricating, e.g., support layers and protection layers. It is to be appreciated that refractive index values can depend on a the temperature of the material. Therefore, unless otherwise specified, refractive index values disclosed herein correspond to a temperature of approximately 25° C.

Conversely, comparatively higher index materials may have refractive indices reaching approximately 2.6, such as titanium dioxide. Higher refractive index materials, that are transparent, may include silicon nitride, silicon oxy nitride, hafnia, alumina, tantala, tantalum oxy nitrides, titanium dioxide, zirconia, scandium oxide, niobium oxide, lanthanum titanate, lanthana, ceria, praseodymia, or yttria. These are the materials that may be used for fabricating, e.g., lightguides. Accordingly, a higher refractive index material used as lightguide material and in conjunction with lower lightguide materials as the material surrounding the lightguide allows for a refractive index difference as high as approximately 1.2. If a lightguide is surrounded by air, a refractive index difference may be as high as approximately 1.6. A lower limit for a refractive index difference between a lightguide and its surrounding material may be one that merely allows for total internal reflection within the lightguide, for example, the difference may be approximately 0.15.

Therefore, in some embodiments, a difference between refractive indices $n_d$ and $n_{0,2}$ (or $n_{0,1}$) is approximately 0.15-1.6. In some embodiments, a difference between refractive indices $n_d$ and $n_{0,2}$ (or $n_{0,1}$) is approximately 0.15-1.2.

When field of view constraints are not as stringent, a constraint on the refractive index difference between a lightguide and its surrounding material may be relaxed. Therefore, in some embodiments, a difference between refractive indices $n_d$ and $n_{0,2}$ (or $n_{0,1}$) is approximately 0.3-1.2. In some embodiments, a difference between refractive indices $n_d$ and $n_{0,2}$ (or $n_{0,1}$) is approximately 0.3-1.1. In some embodiments, a difference between refractive indices $n_d$ and $n_{0,2}$ (or $n_{0,1}$) is approximately 0.4-1.1. In some embodiments, a difference between refractive indices $n_d$ and $n_{0,2}$ (or $n_{0,1}$) is approximately 0.5-1.1. In some embodiments, a difference between refractive indices $n_d$ and $n_{0,2}$ (or $n_{0,1}$) is approximately 0.6-1.1. It will be apparent to those skilled in the art that other value ranges for a refractive index difference are possible.

Figure 19:
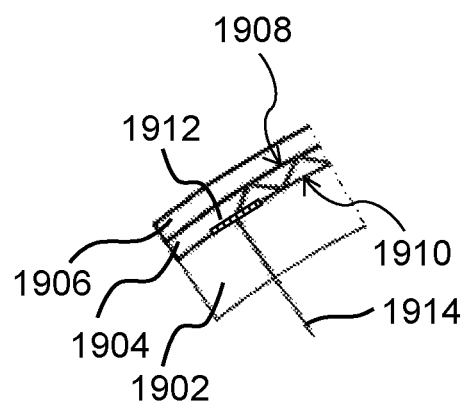
FIG. 19-20 show input sections of optical devices, according to one or more embodiments.

The present disclosure provides different structural configurations that allow incoupling light into lightguides. FIG. 19 shows an input section 1900 of an optical device. In some embodiments, input section 1900 comprises a support layer 1902, lightguide 1904, an interface 1908, an interface 1910, and a grating 1912. In some embodiments, input section 1900 comprises a protection layer 1906. In other embodiments, protection layer 1906 may be absent, for example, in order to reduce a thickness and/or overall size of the optical device comprising input section 1900.

In some embodiments, support layer 1902 is stacked with lightguide 1904 at interface 1908. Protection layer 1906 is stacked with lightguide 1904 at interface 1910. Grating 1912 is positioned at interface 1908 or interface 1910 according to refraction or reflection operation (reflection position not depicted). In other embodiments, grating 1912 is positioned inside lightguide 1904, e.g., not in contact with support layer 1902 or protection layer 1906 (position not depicted). In some embodiments, support layer 1902 receives light 1914 before being received by lightguide 1904. In other words, light 1914 is transmitted into support layer 1902 before interacting with grating 1912.

Figure 20:
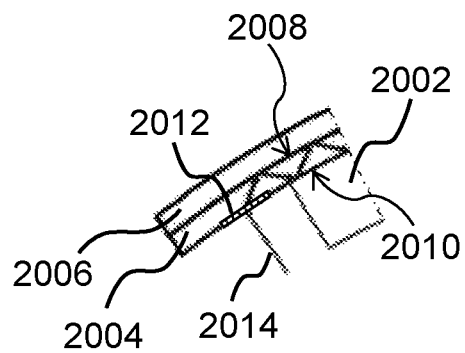

FIG. 20 shows an input section 2000 of an optical device. In some embodiments, input section 2000 comprises a support layer 2002, a lightguide 2004, an interface 2008, an interface 2010, and a grating 2012. In some embodiments, input section 2000 comprises a protection layer 2006. In other embodiments, protection layer 2006 may be absent, for example, in order to reduce a thickness and/or overall size of the optical device comprising input section 2000.

In some embodiments, support layer 2002 is stacked with lightguide 2004 at interface 2008. Support layer 2002 is not in the path of light 2014 that is directed at grating 2012. Protection layer 2006 is stacked with lightguide 2004 at interface 2010. Grating 2012 is positioned at interface 2008 or interface 2010 according to refraction or reflection operation (reflection position not depicted). In other embodiments, grating 2012 is positioned inside lightguide 2004, e.g., not in contact with support layer 2002 or protection layer 2006 (position not depicted). In some embodiments, light 2014 avoids going through support layer 2002 prior to being received at lightguide 2004. In other words, light 2014 interacts with grating 2012 without first having gone through support layer 2002.

Figure 21:
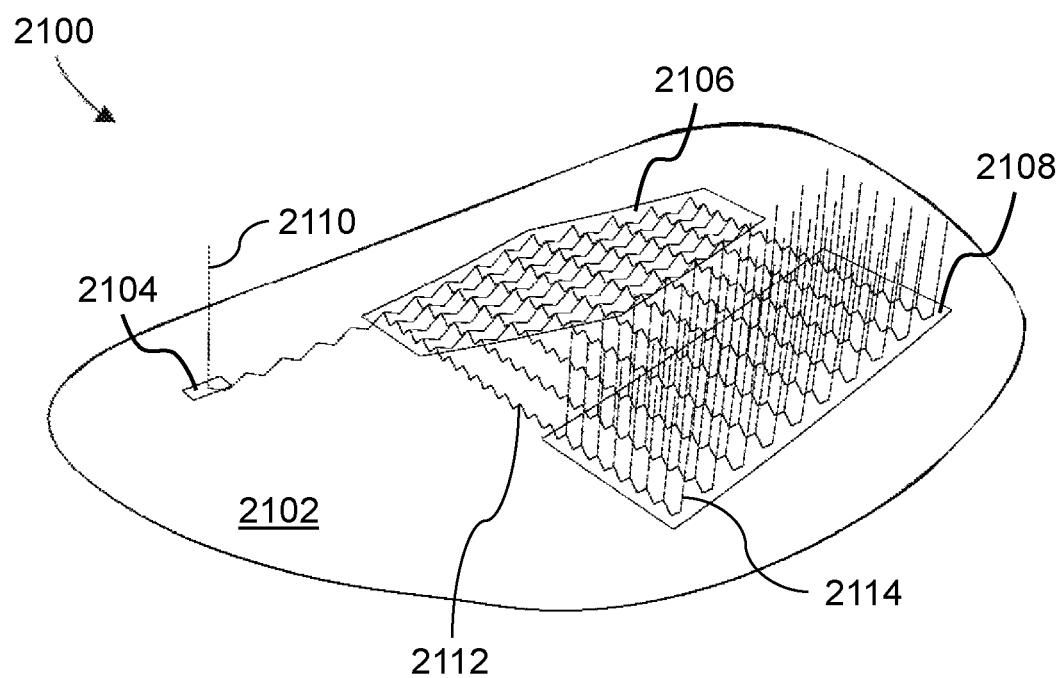
FIG. 21 shows an optical device, according to one or more embodiments.

Until now, light output from an optical device or a lightguide have been illustrated in cross-sectional diagrams, which makes it difficult to show multiple rows of output beams that may form a two-dimensional image. The present invention provides structures to expand (e.g., replicate, cross-couple) the incoupled light so that the outcoupled portion of the light forms a two dimensional array where each member of the array is a replication of the incoupled light. FIG. 21 shows an optical device 2100, according to one or more embodiments. In some embodiments, optical device 2100 comprises a lightguide 2102, a grating 2104, a grating 2106, and a grating 2108.

In some embodiments, lightguide 2102 has a shape similar to a curved eyeglass lens. Though a shape of a right-eye lens is shown in FIG. 21, it will be apparent to those skilled in the art that elements and structures on a left-eye lens may be mirrored. In some embodiments, grating 2108 is positioned in the expected path of a straight-ahead line of sight of a user of optical device 2100. To aid this placement, optical device 2100 may be mounted on frames of a head-mounted display (e.g., eyeglass frames). In some embodiments, grating 2104 and grating 2106 are positioned so as to be proximate to a light source (not shown) that generates light 2110. For example, FIG. 21 illustrates a position of grating 2104 that is more toward the nose of a user.

In some embodiments, grating 2104 receives light 2110. Grating 2104 inputs light 2110 into lightguide 2102 in one direction order (−1 or +1). Diffraction orders of grating 2104 are so directed that light 2110 is guided by TIR. Light 2110 travels through lightguide 2102 toward grating 2106. Grating 2106 receives light 2110. In some embodiments, grating 2106 is engineered so that it has two diffraction orders (e.g., 0 and 1, 0 and −1, or −1 and +1). In some embodiments, grating 2106 generates beams 2112 by iterative beam splitting of light 2110. Because of its function, grating 2106 is also known as a pupil expander or a cross-coupling grating. Grating 2016 may also be called an intermediate grating, for example, when its optical position lies between an incoupling grating and an outcoupling grating. Grating 2016 may also be combined with an outcoupling grating to form an ouptcoupling/cross-coupling combination grating. Diffraction orders of grating 2106 are so directed that beams 2112 are guided by TIR. Beams 2112 travel through lightguide 2102 toward grating 2108. In some embodiments, grating 2108 also has two diffraction orders (e.g., 0 and 1, 0 and −1, or −1 and +1). Grating 2108 generates beams 2114 by iterative beam splitting of beams 2112. In some embodiments, grating 2108 is engineered so that one diffraction order continues to be guided through lightguide 2102 while the other diffraction order outputs beams 2114 from lightguide 2102. The efficiency of the diffraction orders vary over grating 2108 along a vertical viewing direction so that beams 2114 have substantially uniform intensity. In some embodiments, beams 2114 form a two dimensional array where each member of the array is a replication of light 2110. Beams 2114 then form an image at a viewer's retina. The pupil expander setup of FIG. 21 is one of a number of possible configurations that allow an optical device to generate and display a two-dimensional image. The configuration provided here is not limiting.

It will be apparent to those skilled in the art that multiple wavelengths may be used in embodiments of the present invention. For example, in one or more embodiments, a single lightguide may be engineered to deliver a single color of light. For example, the light may comprise red (620-750 nm), green (495-570 nm), or blue (430-495 nm) wavelengths. In some embodiments, multiple lightguides may be engineered where each lightguide delivers a single wavelength of light, for example, red, green, and blue wavelengths. In some embodiments a single waveguide can deliver light having wavelengths across the visible spectrum (400 nm-750 nm). It will be apparent to those skilled in the art that other combination of wavelengths of light and number of lightguides are possible.

A head-mounted display may be designed to handle a variety of colors and also place images at a variety of apparent distances from a viewer. It will be apparent to those skilled in the art that multiple lightguides may be used (e.g., stacked) and spaced using a separating material (e.g., to promote TIR). Each lightguide in a stack of lightguides may be used for a distinct wavelength and also to display images at various apparent distances (e.g., depth) from a viewer. In some embodiments, a system of optical devices comprises a plurality of stacked optical devices (e.g., the optical device of FIG. 4, not limited). Each optical device of the stacked optical devices are engineered according to an embodiment disclosed herein. Each optical device of the stacked optical devices is configured to produce an image having a light of given wavelength(s) (e.g., red, green, and/or blue) that has an apparent distance from a viewer using the head-mounted display. It will be apparent to a person skilled in the art that different combinations of optical device stacks are possible. For example, three optical devices may be used in a stack, each optical device handling red, green and blue wavelengths individually but all configured to form an image at a common apparent depth.

In some embodiments, a total thickness of an optical device does not exceed approximately 20 mm. In some embodiments, a total thickness of an optical device does not exceed approximately 15 mm. In some embodiments, a total thickness of an optical device does not exceed approximately 12 mm. In some embodiments, a total thickness of an optical device does not exceed approximately 11 mm. In some embodiments, a total thickness of an optical device does not exceed approximately 10 mm.

Embodiments of the present invention may be implemented in a variety of fabrication methods. For example, an initial layer (e.g., lightguide or support layer) is first fabricated. The fabrication method may be, for example, injection molding, laminating, or pressing into shape. Subsequent adjacent layers may be deposited onto the initial layer. A material deposition technique may be, for example, overmolding, thin film deposition, lamination. The initial layer may already include features, such as gratings. Alternatively, grating features may be etched, scribed, nano-imprinted, or pressed onto the initial layer. Subsequent deposition of adjacent layers fill in the grating features. In this scenario, the grating is integral with the lightguide. Alternatively, a material that is different from the initial adjacent layer may be used to fill in the grating features. These fabrication methods are provide merely as examples and are not limiting.

As used herein, the singular forms "a," "an" and "the" include plural referents unless the context clearly dictates otherwise. Thus, for example, reference to "a" component includes aspects having two or more such components, unless the context clearly indicates otherwise.

It is to be understood that the phraseology or terminology herein is for the purpose of description and not of limitation such that the terminology or phraseology of the present specification is to be interpreted by those skilled in relevant art(s) in light of the teachings herein.

The embodiment(s) described, and references in the specification to "one embodiment," "an embodiment," "an example embodiment" and the like indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Unless otherwise expressly stated, it is not intended that any method set forth herein be construed as requiring that all its steps be performed or that its steps be performed in a specific order. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. An optical device comprising:
a stack of curved optical elements, the stack comprising:
a first curved optical element stacked with a second curved optical element, wherein the second curved optical element is configured to propagate light by total internal reflection;
an incoupling diffractive grating configured to incouple the light into the second curved optical element; and
an outcoupling diffractive grating optically coupled to the incoupling diffractive grating through the second curved optical element, the outcoupling diffractive grating configured to direct the light,
wherein the first curved optical element has a first refractive index,
wherein the second curved optical element has a second refractive index, and
wherein the first refractive index is different from the second refractive index by approximately 0.15 to 1.2.

2. The optical device of claim 1, wherein:
the stack further comprises a third curved optical element stacked with the second curved optical element;
the third curved optical element is configured to protect the second curved optical element; and
the third curved optical element has a third refractive index that is different from the second refractive index by approximately 0.15 to 1.2.

3. The optical device of claim 2, wherein each of the incoupling and outcoupling diffractive gratings is positioned along an interface between the first curved optical element and the second curved optical element, along another interface between the second curved optical element and third curved optical element, or inside the second curved optical element.

4. The optical device of claim 2, wherein the third curved optical element comprises an optical shape configured to provide ophthalmic corrective power on a real-world image.

5. The optical device of claim 2, further comprising an interlayer positioned between the first curved optical element and the second curved optical element, and/or another interlayer positioned between the second curved optical element and third curved optical element.

6. The optical device of claim 5, wherein the interlayer and/or another interlayer comprise an air gap or adhesive material.

7. The optical device of claim 2, wherein the first curved optical element and/or third curved optical element comprise polymethylmethacrylate, polymethylpentene, cyclo olefin polymer, cyclic olefin copolymer, styrene acrylate, polycarbonate, CR-39, polystyrene, polyetherimide, polyethersulfone, polyethylene terephthalate, or high purity fused silica.

8. The optical device of claim 1, wherein the first refractive index is between approximately 1.4-1.6 and the second refractive index is greater than approximately 1.7.

9. The optical device of claim 1, wherein the outcoupling diffractive grating is further configured to redirect at least a portion of the light into the second curved optical element.

10. The optical device of claim 1, wherein the outcoupling diffractive grating is further configured to outcouple at least a portion of the light into the first curved optical element.

11. The optical device of claim 10, wherein the outcoupling diffractive grating is further configured to direct the outcoupled portion of the light such that the light converges, diverges, or is substantially collimated.

12. The optical device of claim 10, wherein the first curved optical element comprises an optical shape configured to redirect the outcoupled portion of the light such that the light converges, diverges, or is substantially collimated as the light exits the first curved optical element.

13. The optical device of claim 10, further comprising at least an intermediate grating configured to expand the incoupled light so that the outcoupled portion of the light forms a two-dimensional array where each member of the two-dimensional array is a replication of the incoupled light.

14. The optical device of claim 1, wherein each of the incoupling and outcoupling diffractive gratings comprises a reflective grating or a refractive grating.

15. The optical device of claim 1, further comprising a horizontal base curve greater than approximately base 2, base 4, base 6, base 8, or base 10.

16. The optical device of claim 1, wherein a thickness of the second curved optical element does not exceed approximately 1000 microns, 800 microns, or 600 microns.

17. The optical device of claim 1, wherein a thickness of the optical device does not exceed approximately 15.0 mm, 12.0 mm, 11 mm, or 10 mm.

18. The optical device of claim 1, wherein the second curved optical element comprises silicon nitride, silicon oxy nitride, hafnia, alumina, tantala, tantalum oxy nitrides, titanium dioxide, or zirconia, scandium oxide, niobium oxide, lanthanum titanate, lanthana, ceria, praseodymia, or yttria.

19. The optical device of claim 1, further comprising a maximum horizontal field of view greater than approximately 40 degrees and less than approximately 140 degrees, greater than approximately 60 degrees and less than approximately 140, greater than approximately 80 degrees and less than approximately 140, greater than approximately 100 degrees and less than approximately 140, or greater than approximately 120 degrees and less than approximately 140.

20. A system of optical devices, the system comprising:
a plurality of stacks of curved optical elements, each stack, of the plurality stacks, comprising:
a first curved optical element stacked with a second curved optical element, wherein the second curved optical element is configured to propagate light by total internal reflection;
an incoupling diffractive grating configured to incouple the light into the second curved optical element; and
an outcoupling diffractive grating optically coupled to the incoupling diffractive grating through the second curved optical element, the outcoupling diffractive grating configured to direct the light,
wherein the first curved optical element has a first refractive index,
wherein the second curved optical element has a second refractive index, and
wherein the first refractive index is different from the second refractive index by approximately 0.15 to 1.2.

* * * * *

UNITED STATES PATENT AND TRADEMARK OFFICE
CERTIFICATE OF CORRECTION

| | | |
|---|---|---|
| PATENT NO. | : 11,828,941 B2 | Page 1 of 1 |
| APPLICATION NO. | : 16/778912 | |
| DATED | : November 28, 2023 | |
| INVENTOR(S) | : Michael Lucien Genier et al. | |

It is certified that error appears in the above-identified patent and that said Letters Patent is hereby corrected as shown below:

In the Claims

In Column 20, Line 33, in Claim 18, delete "praseodymia," and insert -- praseodymium, --.

Signed and Sealed this
Twenty-third Day of July, 2024

Katherine Kelly Vidal
*Director of the United States Patent and Trademark Office*